July 25, 1967
K. H. CASSON
3,332,553
VACUUM FILTER
Filed Oct. 29, 1964
7 Sheets-Sheet 1
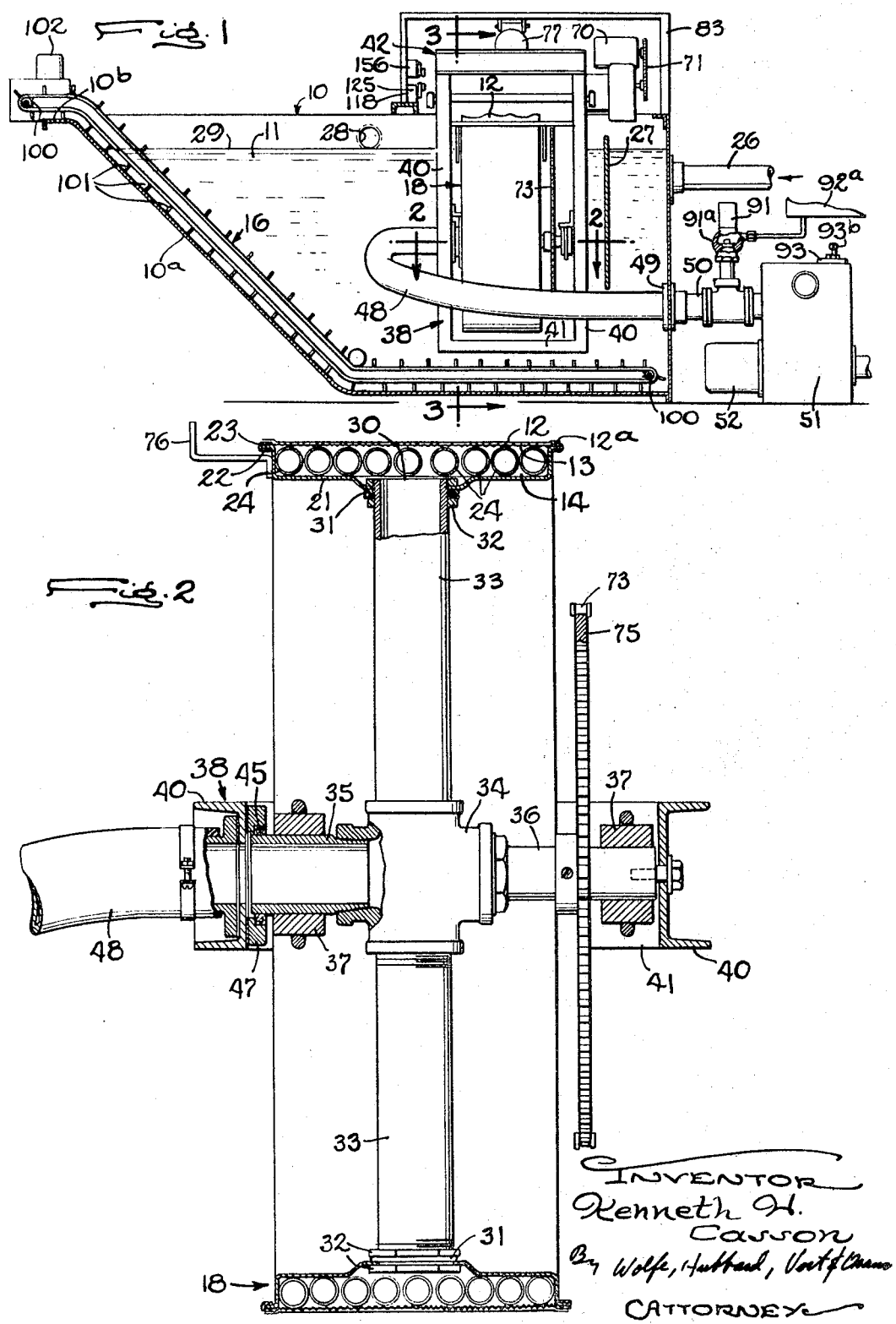

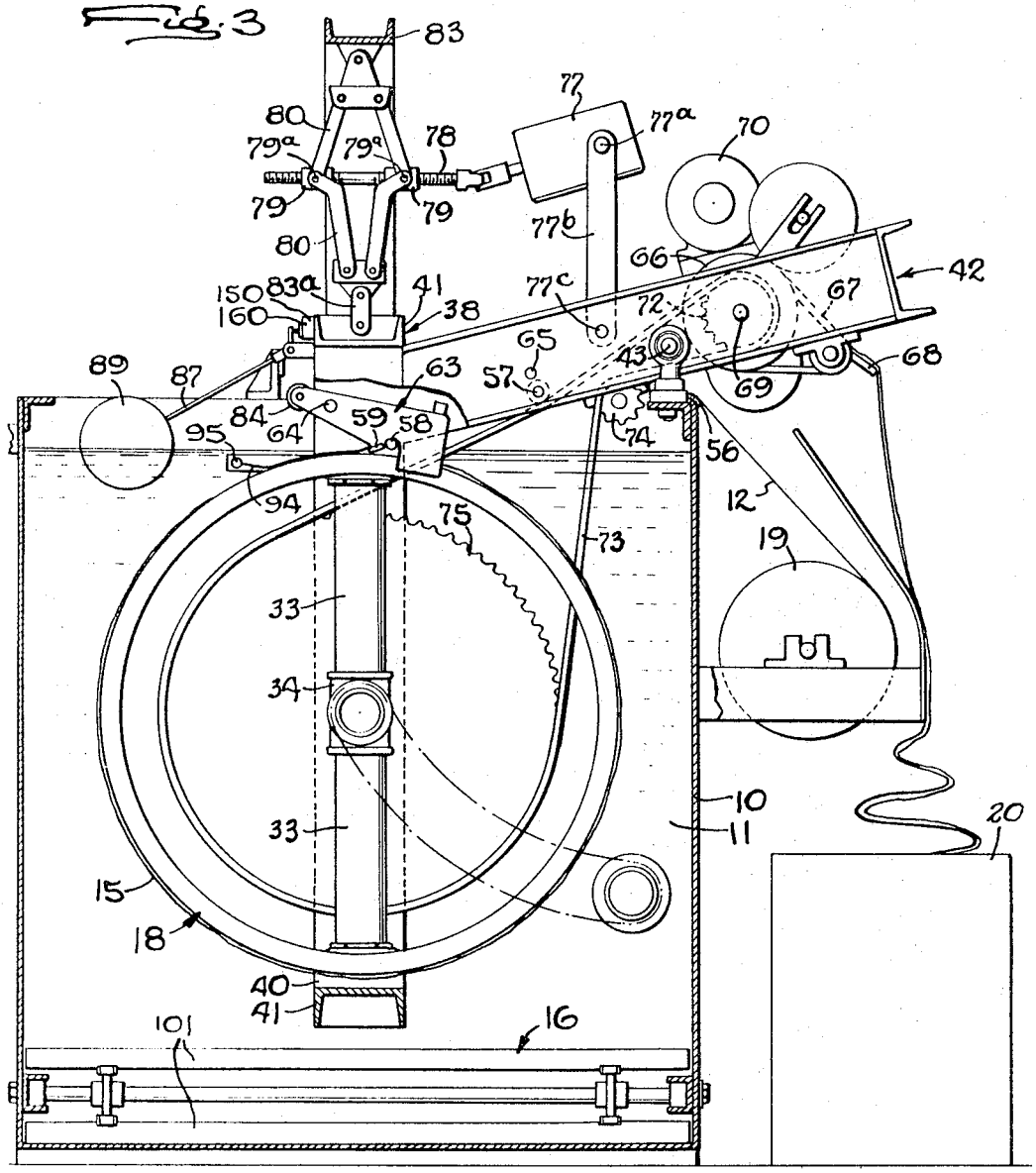

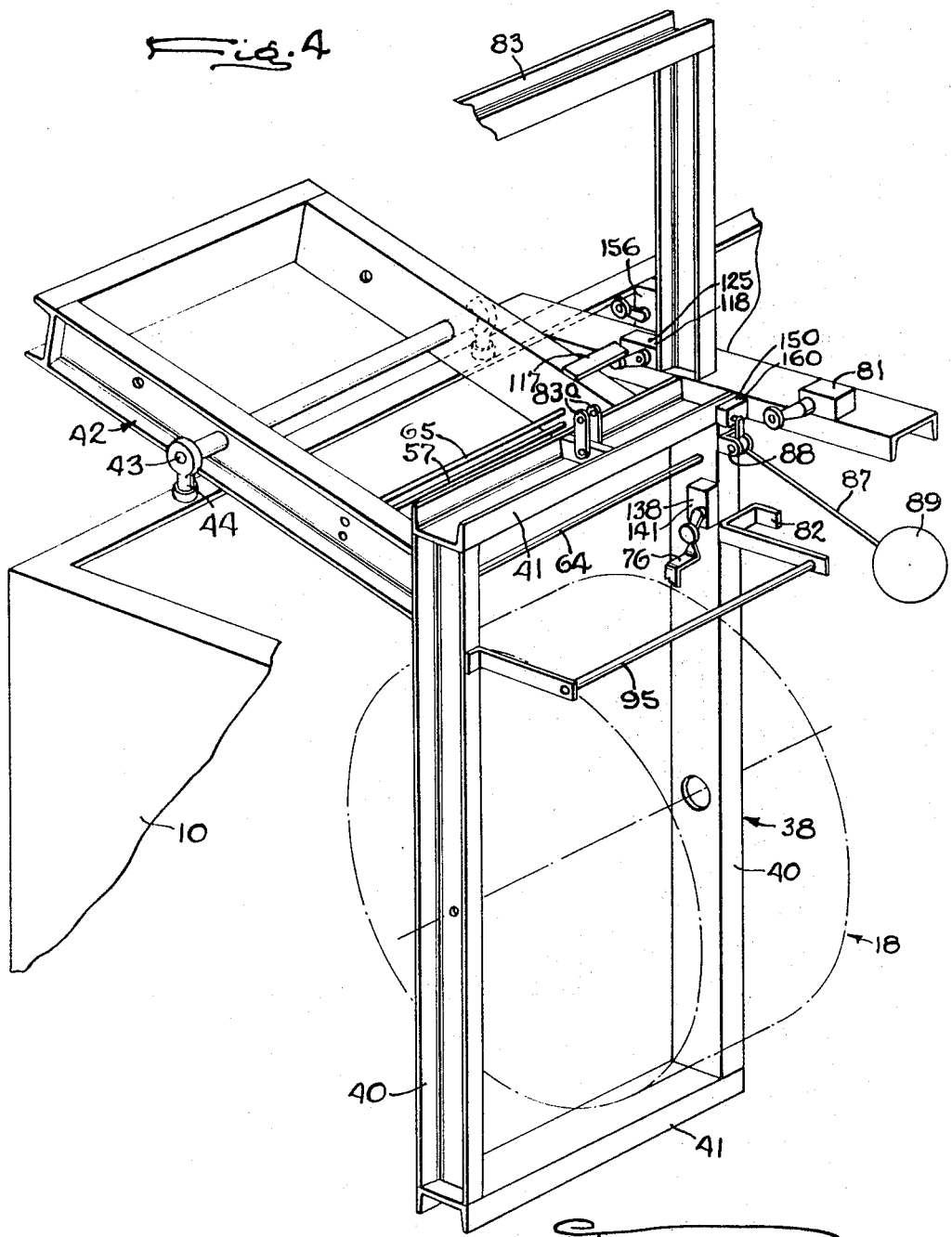

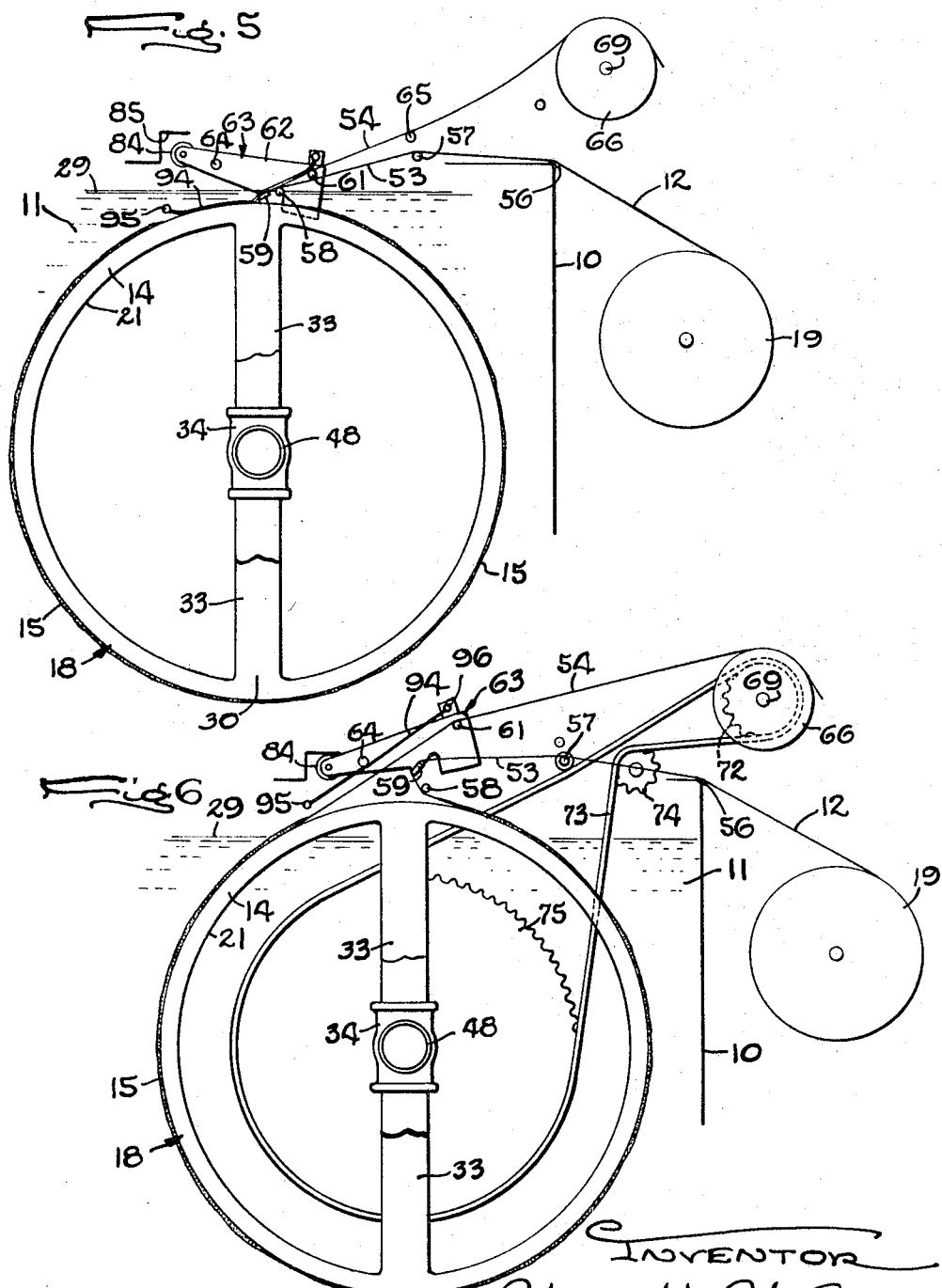

July 25, 1967 K. H. CASSON 3,332,553
VACUUM FILTER
Filed Oct. 29, 1964 7 Sheets-Sheet 5
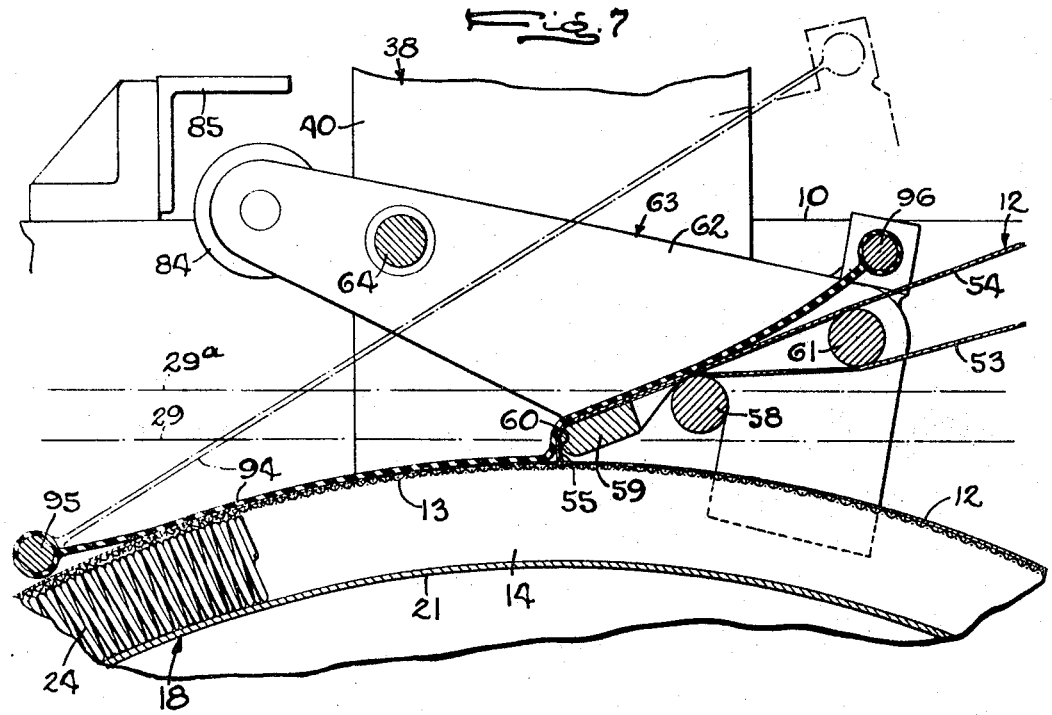
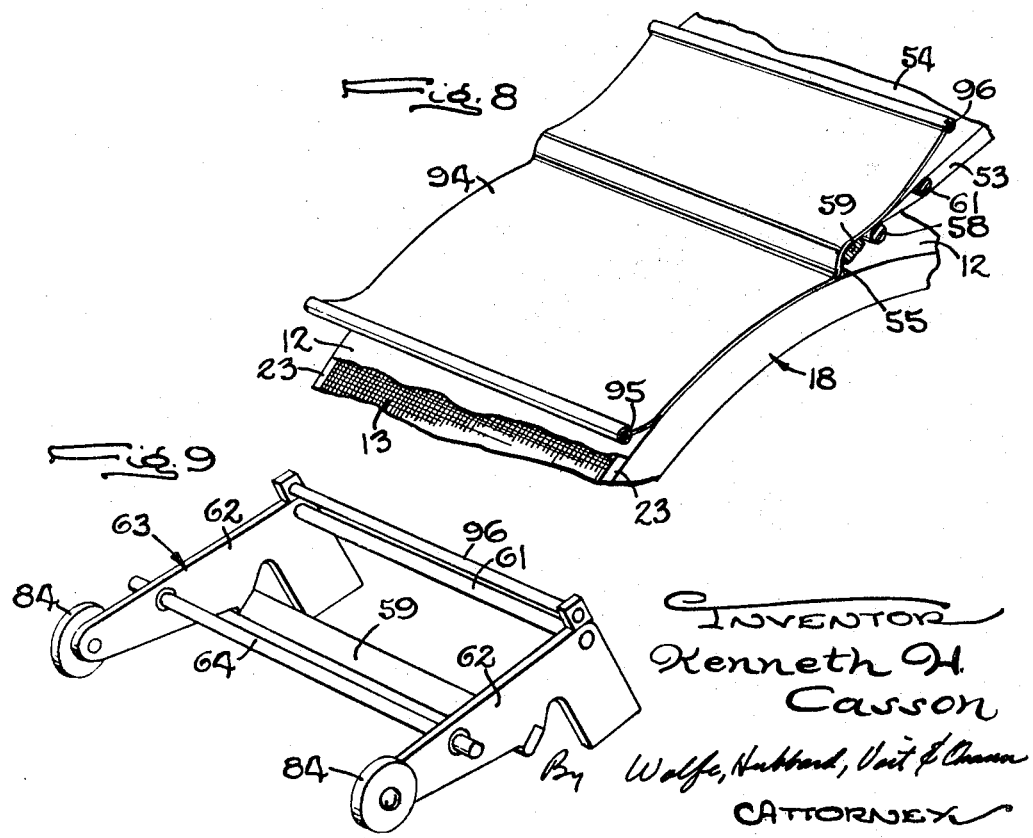
INVENTOR
Kenneth H. Casson
By Wolfe, Hubbard, Voit & Osann
ATTORNEY

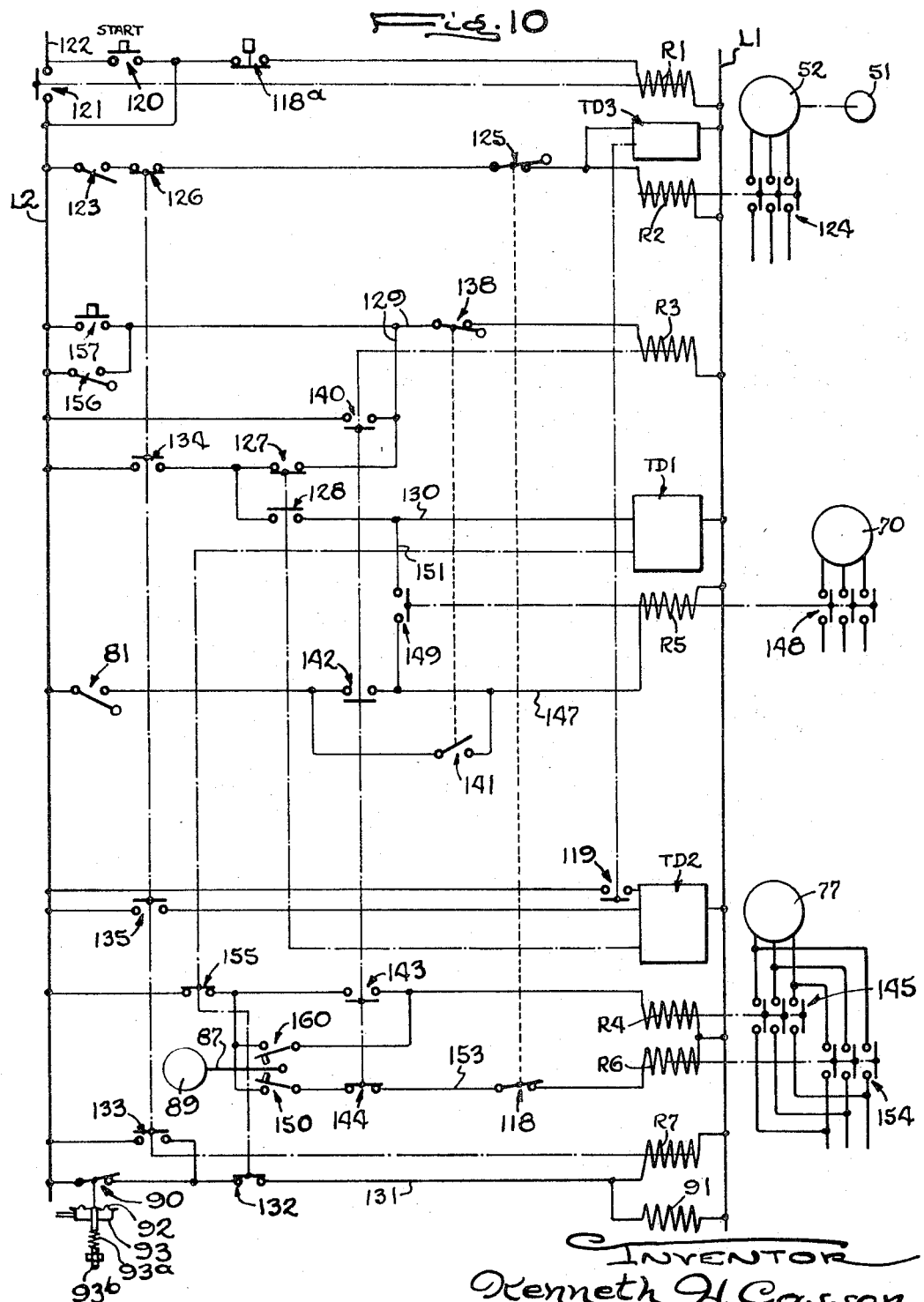

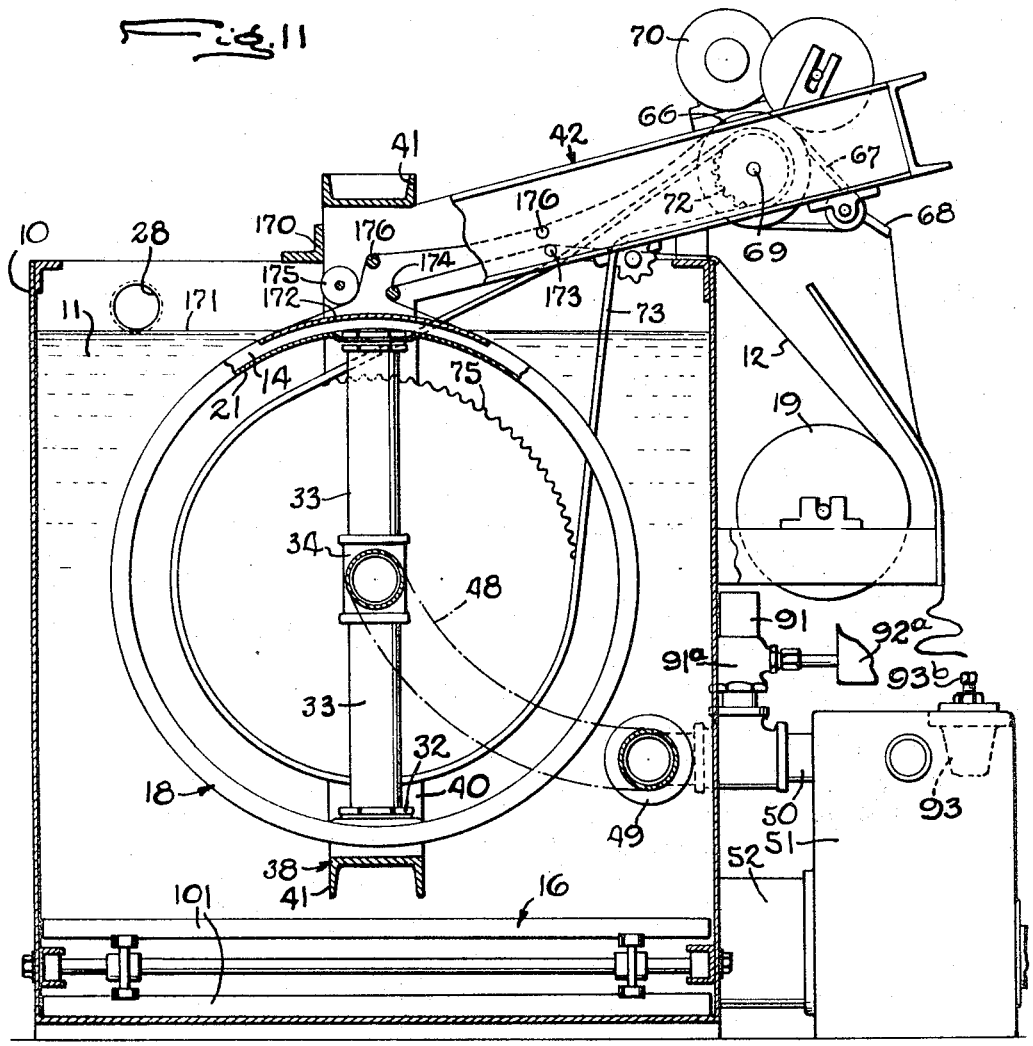

United States Patent Office 3,332,553
Patented July 25, 1967

3,332,553
VACUUM FILTER
Kenneth H. Casson, Winnebago, Ill., assignor to Barnes Drill Co., Rockford, Ill., a corporation of Illinois
Filed Oct. 29, 1964, Ser. No. 407,313
7 Claims. (Cl. 210—103)

ABSTRACT OF THE DISCLOSURE

A vacuum filter in which a filter web is wrapped around the perforated wall of an indexable drum submerged in liquid to be filtered, with a pump drawing clean liquid from the interior of the drum. Filtering is interrupted intermittently and liquid is forced reversely through the web to release the accumulated filter cake in response to development of a predetermined sensed vacuum in the drum, and is resumed before the seal between the web and the drum is broken. When the pores of the web become substantially clogged, as sensed by timing the length of the filtering cycle, the drum is raised, a positive pressure is introduced to loosen the web and release the filter cake, the drum is indexed to advance a new length of web into filtering position, and the drum is lowered back into the liquid for a new cycle. In a modified embodiment, an arcuate portion at the top of the drum is formed as an imperforate strip that is returned to the top of the drum after each indexing step to eliminate the need for raising the drum out of the liquid.

---

This is a continuation-in-part of my prior application Ser. No. 131,327, filed Aug. 14, 1961, and now abandoned, and relates to liquid filters of the so-called blow-back type in which, when the filter medium becomes clogged in service use, the filtering action is interrupted while the medium is being at least partially cleaned by reversing the flow of liquid therethrough to loosen and release the cake of filtered out solids accumulated on the medium. In certain of its aspects, the invention relates more particularly to a vacuum filter of the type in which a perforated wall of a vacuum chamber is submerged in the dirty liquid to be filtered and covered by a length of filter web which may be renewed by endwise indexing of the web.

The general object is to provide a vacuum filter of the above character which, as compared to prior filters, is more economical to manufacture and operate in service and possesses a substantially greater filtering capacity for a given overall size.

A second object is to provide a filter of the above character in which the interval during which the filtering action is interrupted to blow-back the filtrate and release the filter cake is substantially shorter than in prior filters.

A third object is to provide for cleaning of the filter medium by a blow-back action in a filter of the type in which the medium is a web wrapped around the outer perforated wall of an annular vacuum chamber submerged in the dirty liquid and mounted for rotational indexing to replenish the web.

A fourth object is to minimize the interruption of the filtering action for cleaning the web by collecting and disposing of the released filter cake or sludge while the next filtering cycle is progressing.

A fifth object is to provide a novel means for sensing an eventual clogging of the filter web as a result of a succession of alternate filtering and blow-back cycles.

A sixth object is to provide for rapid and automatic replacement of the filter web in response to eventual clogging thereof.

A seventh object is to prevent the filter cake from building up to an objectionable thickness on any part of the web on which it tends to adhere after a blow-back cycle.

The invention also resides in the novel manner of producing the blow-back action and of controlling the renewal of the filter web.

Other objects and advantages of the invention will become apparent from the following detailed description taken in connection with the accompanying drawings, in which FIGURE 1 is an elevational view of the improved filter with the tank thereof broken away and shown in section.

FIGS. 2 and 3 are fragmentary sectional views taken respectively along the lines 2—2 and 3—3 of FIG. 1.

FIG. 4 is a fragmentary perspective view of the frame for supporting the filter drum.

FIGS. 5 and 6 are schematic views showing the positions of the filter drum and web during filtering and during indexing of the web.

FIG. 7 is an enlarged and fragmentary view of a part of FIG. 5.

FIG. 8 is a fragmentary perspective view of a part of FIG. 7.

FIG. 9 is a perspective view of the carrier for the filter web.

FIG. 10 is a schematic view and wiring diagram for controlling the operation of the filter shown in FIGS. 1 to 8.

FIG. 11 is a view similar to FIG. 3 showing a modified form of the filter.

The invention in general

The improved blow-back filter comprises generally an open tank 10 adapted to contain a body 11 of liquid to be filtered through an elongated strip or web 12 of a suitable filter medium covering the perforated wall 13 of a chamber 14 submerged in the liquid and subjected internally to a vacuum for inducing straining of the liquid through the web. Intermittently, the vacuum is dissipated and a positive pressure is produced in the chamber 14 to loosen and release the filtered out solids or cake 15 from the downwardly facing and downwardly inclined surface areas of the web. These solids gravitate downwardly in the tank and are caught by a suitable means such as a continuously operating conveyor 16 by which they are removed from the tank automatically while the next filtering cycle is progressing as a result of restoration of the vacuum in the chamber 14 shortly after release of the cake.

The member supporting the filter web may take various shapes. For example, the vacuum chamber 14 may be in the form of an annulus, the perforated wall 13 of the chamber being, in this instance, a cylindrical screen forming the outer periphery of a drum 18 and covered with a length of the web 12 drawn from a supply roll 19 and extended downwardly into the liquid 11. After passing around the drum screen, the web is led upwardly out of the liquid and over suitable guides to a disposal receptacle 20 outside of the tank.

With the drum of such general construction, replenishment of all or part of the active length of filter web may be effected simply by indexing the drum about a horizontal axis. Such turning may be effected under manual control with the form shown in FIG. 11, when the web has, after a plurality of blow-back or cleaning cycles, become so clogged as to impair its filtering efficiency. Or, with the construction shown in FIGS. 1 to 9 which is preferred for larger installations, the clogged condition of the web may be detected and the indexing of the drum may be effected entirely automatically.

The supporting member also may take the form of a box-like closure in which the web is indexed across the flat screen covering the open lower side of the box. A filter of this general type is disclosed in my copending application Ser. No. 381,113, filed July 8, 1964, now Patent No. 3,305,094 to which reference is made for details of construction not included herein.

Automatic type of filter

Referring now to FIGS. 1 to 8, the inner and side walls of the vacuum chamber 14 are integral with each other and form a channel 21 having out-turned cylindrical flanges 22 encircled by and suitably secured to the margins of the screen 13 (see FIG. 2). These flanges and screen margins are straddled by strips 23 of U-shaped section composed of yieldable material such as rubber so as to provide continuous outwardly facing cylindrical surfaces against which the margins 12ª of the web 12 become sealed under the applied vacuum. Intermediate its edges, the screen 13 is suitably backed as by coils 24 of wire helically wound and laid in and extending around the entire circumference of the channel 21.

The tank 10 is a box-like construction somewhat deeper than the diameter of the drum 18 and having an inlet 26 through which the liquid to be filtered is delivered at a substantially continuous rate approximately equal to the average capacity of the filter. This inlet is separated from the drum by a partition 27 so as to allow for settling of as much of the suspended solids as possible before being carried into the filtering zone around the drum. An overflow outlet 28 disposed somewhat above and remote from the inlet leads to a suitable storage reservoir (not shown) thus normally maintaining the liquid at approximately the desired level 29.

One side wall 10ª of the tank is inclined upwardly as shown in FIG. 1 to provide a track up which one leg of the endless conveyor 16 is drawn continuously. Herein, the conveyor comprises an endless chain meshing with and extending around sprockets and rollers 100 and having spaced flights in the form of angle bars 101 which pick up the solids settling to the bottom of the tank and drag the same up the incline 10ª and over and beyond the edge 10ᵇ of the tank into a suitable collection receptacle (not shown). The upper sprocket of the conveyor is driven continuously by an electric motor 102 through suitable reduction gearing.

The filter web may be composed of various materials, paper having a high wet strength and composed of non-woven fibers of cotton, rayon, nylon, or resin treated cellulose being preferred. It is wide enough to cover all of the holes in the screen 13 and overlap the rubber strips 23.

The channel forming the filter drum is apertured as indicated at 30 and clamped rigidly through pressure tight seals 31 (FIG. 2) and nuts 32 to the outer ends of radially extending pipes 33 whose inner ends are threaded into a hollow fitting 34 having oppositely projecting trunnions 35 and 36 journaled in bearings 37. The latter are mounted in a frame 38 projecting downwardly into the tank to maintain the filter drum submerged in the liquid 11 during the filtering operation. This frame (see FIG. 4) comprises upright side bars 40 rigidly joined at their upper and lower ends by cross-bars 41. Rigid with the upper end of the frame is a laterally projecting rectangular extension 42 which is inclined upwardly across the upper edge of the tank where it is fulcrumed at 43 on posts 44 upstanding from one wall of the tank 10.

One of the drum trunnions is sealed at 45 and journaled in a stationary ring 47 at the inner end of a nonrotatable conduit 48 which is made flexible herein and is bent reversely (see FIG. 1) beneath the filter drum and coupled to a fitting 49 sealed in and extended outwardly through a wall of the tank. Beyond this wall, the fitting is coupled by a pipe 50 subjected to a vacuum provided in the present instance by a pump 51 driven by an electric motor 52 and adapted, when the motor is running in one direction, to withdraw filtered liquid out of the chamber 14 through the conduit 48 and the pipe 50 and create in the chamber a vacuum whose magnitude at any time is determined by the prevailing condition of the filter web, that is, the extent of clogging of its pores or the density and thickness of the filter cake 15 which has accumulated thereon. Preferably, the pump is of the positive displacement type such as a so-called Moyno pump manufactured by Robbins & Myers.

The full circumference of the drum may be used in the filtering by completely submerging the drum during the filtering action. This is made possible by bringing the on-coming and off-going lengths 53 and 54 (FIGS. 5, 6 and 7) of the web into face to face contact along a line 55 paralleling the drum axis and at the surface of the screen 13. To submerge this seal line and adapt the web, by turning of the drum, for free endwise indexing to renew the active portion of the web and reformation of the seal, the dry and unused web is unwound from the supply roll 19 and led upwardly over the edge 56 of the tank and a stationary guide bar 57 extending across the side bars of the frame extension 42. Beyond the bar 57, the web extends generally horizontally over the top of a stationary bar 58 and the flat top of an adjacent bar 59 having a downwardly rounded side surface 60 which, in normal operation of the filter, is disposed close to the periphery of the submerged filter drum. Beyond the surface 60, the web extends into contact with the screen, bends at right angles at the seal line 55, and then extends clockwise around the entire circumference of the screen. At the seal line, the wet part of the web bends away from the screen in contact with the on-coming part of the web and remains in contact with the fresh web as it extends upwardly and over the top of the cross-bar 59.

Beyond this bar, the used portion of the web extends upwardly and outwardly over a guide bar 61. The latter and the cross-bar 59 parallel each other and span the side bars 62 of a carrier 63 forming a lever which is fulcrumed intermediate its ends on a bar 64 joining the side bars 40 of the vertically movable drum frame 38. The used portion of the filter web then extends over the top of another cross-bar 65 spanning the frame extension 42. Outwardly beyond the latter and beyond the edge of the tank, the used length 54 of the web is led over the top of the roll 66 of rubber or the like and then guided downwardly as by a plurality of laterally spaced V-belts 67 running in grooves in the roll 66. Beyond these belts, the used web gravitates against a plate 68 and is deflected thereby into the reservoir 20. The roll 66 is fixed to a shaft 69 spanning the sides of the extension 42 of the drum frame.

Indexing of the drum to renew all or part of the active portion of the web is accomplished by an electric actuator including a motor 70 (FIGS. 1 and 3) coupled through a belt 71 and a suitable reduction gearing to the shaft 69 above described. This shaft carries a sprocket 72 meshing with an endless chain 73 which extends around an idler sprocket 74 on the tank and a larger sprocket 75 fixed to the trunnion 36 at one end of the drum. The pitch diameters of the sprockets 72, 75 are so correlated with each other that the web portion of the filter and web will be maintained under the proper tension to permit reformation of the seal 55 between the wet and dry portions of the web. The indexing cycles of the motor 70 are terminated by a switch 138 (FIGS. 4 and 10) mounted on the upright drum frame 38 and actuated by one or more lugs 76 secured to the drum channel 21 and projecting parallel to the drum axis. An associated switch 141 is open in the stopped position of the drum and is closed before the switch 138 opens in the initial indexing movement of the drum.

As a preliminary to indexing of the drum to renew the filter web, the seal 55 is exposed above the level 29 of the dirty liquid in the tank and the on-coming and off-going lengths 53 and 54 of the web are separated so as to avoid imposing any substantial strain on the wet web while the drum is being turned to advance a new length of the web into filtering position. This is accomplished by raising the drum frame 38 far enough to carry the seal line 55 out of the dirty liquid and rocking the carrier lever 63 whose fulcrum 64 is spaced different distances away from the bars 59 and 61 carried thereby.

Herein, raising and lowering of the drum frame is effected by energizing a reversible electric motor 77 (FIG. 3) fulcrumed at 77$^a$ on upright links 77$^b$ which are supported at their lower ends on a pivot 77$^c$ on the frame extension 42. The motor shaft is coupled through a suitable reduction gearing to a screw 78 threaded through nuts 79 which are pivotally mounted on the center joints 79$^a$ of two pairs of toggle links 80. The latter are pivotally suspended at their upper ends from a frame 83 and similarly joined at their lower ends to links 83$^a$ connected to the upper cross-member 41 of the drum frame. The diamond shaped jack linkage thus suspending the frame is expanded and contracted upon turning of the screw in opposite directions thus rocking the drum frame 38 about the fulcrum 43 to raise and lower the filter drum. As the drum rises, a lug 82 on the frame 38 closes a switch 81 which initiates indexing of the drum as later described.

After the drum frame has been raised far enough to expose the seal line 55, a roller 84 on the end of the carrier lever 63 opposite the web guide bars 59 and 61 encounters a stationary abutment 85 in the form of an angle bar secured to the top of the tank. Then, as the frame continues upwardly, the carrier is rocked counterclockwise and swung to the position shown in FIG. 6 by the time the cycle of the elevating motor 77 is completed. The dry and wet portions of the filter web then disposed above the level 29 of the dirty liquid are thus separated from each other. After indexing the drum, the motor 77 is reversed and through the screw 78 and toggle mechanism rocks the frame 38 downwardly to bring the wet and dry lengths of the web back into contact with each other at the rounded surface of the bar 59 and reform the seal 55 when the vacuum within the chamber is restored.

The motor 77 may also be controlled by switches 150 and 160 (FIGS. 4 and 10) to adjust the vertical position of the drum frame and automatically maintain a desired spacing between the top of the drum and the level 29 of the dirty liquid in the tank thereby compensating for changes in this level during the filtering operation. Herein, these switches are fixed to the drum frame and actuated by a lever 87 fulcrumed at 88 on the drum frame and having a short arm engaging the actuator pin of the switches. A float 89 on the outer end of the lever rides the surface of the dirty liquid, the arrangement being such that the switch 160 is closed when the liquid rises above a preselected level 29$^a$ (FIG. 7) relative to the drum 18 while the switch 150 closes when the liquid falls below the level 29 relative to the drum.

*Normal filtering cycle.*—With the drum positioned as shown in FIGS. 3, 5 and 7, the positive displacement pump 51 withdraws filtered liquid out of the chamber 14 at a fixed rate thus creating a vacuum which increases progressively with the increase in the thickness of the filter cake 15. The filtering efficiency of the web corresponds to the vacuum thus developed thus making it desirable to clean the web from time to time and rejuvenate the length of filter web then supported by the drum.

*Blow-back cycle.*—Such intermittent interruption of the filtering is accomplished by stopping the pump and then forcing filtered liquid reversely through the conduit 48 until a positive pressure has been built up in the chamber 14 thus forcing some liquid out through the web 12. This loosens the cake sufficiently to induce it to gravitate downwardly and off from the downwardly facing areas of the filter drum and also to slide down along those upper parts of the drum which slope downwardly at a substantial angle.

While the filtering may be interrupted and a blow-back cycle initiated in accordance with a prearranged schedule, it is preferred to sense the substantial impairment in the filtering efficiency of the web by measuring the vacuum in the chamber 14 and initiating a blow-down cycle in response to development of the vacuum to a predetermined value. Herein, the attainment of such a vacuum is sensed by a switch 90 (FIG. 10) actuated by a diaphragm 92 in a casing 93 (FIG. 1) communicating with the pump intake or the pipe 50. A spring 93$^a$ adjustable by a nut 93$^b$ determines the vacuum at which the switch 90 becomes closed, the switch remaining open at lesser vacuums.

I have discovered that as soon as the vacuum in the chamber 14 has been dissipated, the solids 15 deposited on the outer surface of the web 12 start to loosen and become separated and freed from the web for downward gravitation as soon as a definite positive pressure has been developed sufficient to overcome the head of the dirty liquid above the lowermost part of the web. For example, it has been found that the desired separation of the filter cake is effected when a pressure of no more than two p.s.i. is attained in the chamber and that the filtering may be resumed before the released solids have fallen a substantial distance away from the filter web.

It has also been found that such effective cleaning of the filter web and conditioning thereof for resumption of the filtering at near normal efficiency occurs without continuing the positive pressure build-up to the point of blowing the edges 12$^a$ of the web away from the sealing surfaces. As a result, the effectiveness of the marginal seals is not destroyed.

Based on these discoveries, the present invention contemplates initiating another filtering cycle as soon as the filter cake has been effectively released and without waiting for substantial settling of the cake by downward gravitation through the dirty liquid or catching thereof by the conveyor 16. Accordingly, the blow-back flow of the filtrate is terminated after the lapse of a short interval which may be measured conveniently by an electric timer TD–1 (FIG. 10) of well-known construction which, after being energized, opens switches 132 and 155 after a preselected interval for which the timer is set.

One way of producing a blow-back or web-cleaning cycle is to stop the pump 51 and then admit compressed air to the conduit 48 from a suitable source 92$^a$ and at a proper pressure to force the filtered liquid back into the chamber 14 and develop the desired positive pressure therein. Such blow-back has been achieved successfully with the arrangement shown in FIG. 1 in which, in response to closure of the pressure switch 90, the pump motor 52 is stopped and a solenoid 91 is energized to open a valve 91$^a$ and admit compressed air at a pressure of four p.s.i. for example into the pipe 50 for an interval of about 20 seconds. As soon as the pump comes to a stop, the compressed air forces the filtered liquid trapped in the conduit 48 back into the chamber 14 to develop the desired cake-releasing pressure therein.

In the operation of the filter above described, I have discovered that the filter web 12 will operate at high efficiency with many kinds of liquids to be filtered for a relatively large number of alternate filtering and web-cleaning cycles but that, in the case of most liquids, the successive cycles become progressively shorter due to the trapping of solid particles in the pores of the web. Eventually, the web pores may become so thoroughly clogged that further filtering at the desired efficiency is impaired. Advantage is taken of this discovery in accordance with one aspect of the present invention to determine the useful service life of the filter web and initiate a cycle for indexing the web, herein by indexing the drum, to bring a fresh length of the web into active filtering position. Such point of clogging may be determined by a timer TD–2 (FIG. 10) which is started in operation when normal operation of the filter is resumed after a web-cleaning cycle and which measures an interval somewhat shorter than that expected or required for the pressure switch to be actuated when the filter is operating with the desired efficiency. But, if the web has become so clogged that the pressure switch 90 is actuated before such interval expires, an indexing cycle of the drum is initiated instead of a web-cleaning cycle.

In the filtering of certain liquids, the blow-back cycles may be so effective in cleaning the filter web that alternate filter and blowback cycles may continue for a time sufficient to cause a substantial accumulation of the filtered out solids on the web at the top of the drum. Such an accumulation may, in certain instances, be undesirable in preventing separation of the parts of the web without danger of rupturing the heavily laden wet part when the carrier 63 is rocked to the indexing position shown in FIG. 6.

To obviate the foregoing difficulty, means may be provided to prevent or at least limit the building up of a filter cake of objectionable weight on the top portion of the drum. One way of accomplishing this is to mark off a selected area of the web as by an imperforate sheet 94 substantially covering the contacting parts of the paper forming the seal 55 and the arcuate area of the web at the top of the drum and next to be drawn off from the drum in the next indexing cycle. The sheet 94 is preferably formed from stretchable material such as rubber with one end attached to a stationary bar 95 angularly spaced around the top of the drum from the seal 55 and disposed close to the screen 13.

The opposite end of the rubber sheet is secured to a cross-bar 96 fixed to the carrier 63 disposed adjacent but above the bar 61 and so spaced from the bar 95 that the sheet is relatively loose in the normal position of the carrier 63. Thus, as shown in FIGS. 5, 7 and 8, the sheet rests down against a substantial arc of the filter web to the left of the seal 55 (FIG. 7) and follows the wet and dry parts of the web around the bar 59 so as to mask and prevent the accumulation of an objectionable thickness of the filtered out solids over the area of the web between the seal 55 and the bar 95.

The bar 96 is so located that as an incident to swinging of the carrier 63 out of normal filtering position (FIGS. 5 and 7) to the indexing position (FIG. 6), the masking sheet 94 is lifted away from the web. For this purpose, the bar 96 is spaced far enough from the axis 64 of the carrier 63 as to take up the slack in and preferably stretch the sheet to some degree as the carrier is swung from the position shown in FIG. 5 to that of FIG. 6.

*Operation—Starting the filter*

The numerous novel features of the fully automatic filter above described will be apparent from the following summary of the operation in a succession of alternate filtering and blow-back cycles followed by an indexing cycle to replenish the web on the drum when the filtering efficiency of the web becomes impaired. The several timing devices shown diagrammatically in FIG. 10 are of the type in which the device is reset by a spring upon deenergization of the winding of a motor driving a cam which, after the lapse of an adjustable and preselected time interval operates to change the condition of one or more switches. Such timers are manufactured by Eagle Signal Company and sold under the trade name of Microflex.

Assuming that the motors 52, 70 and 77 are stopped, all relays and timers are deenergized, the tank is filled with liquid up to the level 29, the drum 18 is covered with fresh paper, completely submerged in the liquid and at rest in position shown in FIG. 3, the filtering action is initiated by closing a start switch 120 to energize a relay R1 through a normally closed stop switch 118a and thereby close a switch 121 which connects a terminal 122 of the power source to the line L2. A switch 123 is then closed manually to energize a relay R2 and close switches 124 for starting the pump motor 52, the relay circuit extending through the then closed low level indicating switch 125 and a switch 126 of the relay R7. The switch 125 and a switch 118 are opened by a lug 117 (FIG. 4) whenever the liquid in the tank falls to an abnormally low level and, as a consequence, the drum frame is lowered by the action of the float switches.

Simultaneously with the starting of the pump, the cycle selecting timer TD–2 is energized by a timer TD–3 whose motor winding is in parallel with the relay R2 which starts the filtering cycle. After a short delay, for example one second, TD–3 times out and closes a switch 119 to energize the winding of the timer TD–2 and start the time measuring cycle thereof.

In the initial operation of the pump, filtrate is pumped out of the chamber 14 through the conduit 48 at a fixed rate determined by the displacement capacity of the pump. As a result, a vacuum will be created in the chamber drawing liquid through the web 12 and, because of the fixed rate of filtrate withdrawal, this vacuum will increase gradually as the filtered out solids 15 build up on the web.

The filtering cycle will continue until the vacuum attains the value for which the vacuum switch 90 is set to respond by closing its contacts. Thereupon, the pump 51 is stopped and either a blow-back cycle or a indexing cycle to renew the filter web will be executed. The selection of the cycle is made by the timer TD–2 acting in conjunction with the vacuum switch. This timer is set to measure an interval determined by various factors as above described and usually varying from 1 to 15 minutes in different installations. A normally closed switch 127 of the timer becomes opened when the timer times-out while an associated switch 128 becomes closed. The effect of this is to withdraw an indexing cycle control relay R3 from control by the vacuum switch and to prepare a circuit 130 for energization of a timer TD–1 by which the duration of the blow-back cycle is determined.

The vacuum which closes the switch and is best suited for any installation is determined by numerous factors including the fineness and character of the material to be filtered out of the liquid, the desired purity of the filtrate, etc. When the active length of filter web is new or operative at the desired efficiency, such vacuum usually will not be attained until after the interval for which the timer TD–2 is set expires to close the switch 128. In such event, a blow-back cycle will be executed to remove the accumulated filter cake off from the web and at least partially clean for continued use in filtering.

*Operation of clean filter web*

After closure of the switch 128 by the timer TD–2, the filtering continues until the vacuum eventually builds up to the value at which the vacuum switch 90 is closed. This completes a circuit 131 through the normally closed switch 132 of the timer TD–1, thus energizing the relay R7 which open its switch 126 to deenergize the relay R2 and the pump motor 52 and terminate the filtering cycle. This is accompanied by deenergization of the timer TD–3 which resets itself and opens the switch 119 but the energization of the timer TD–2 is continued by virtue of the closure of a switch 135 by the relay R7, this switch being in parallel with the switch 119 and always closed before the latter is opened in the resetting of TD–3.

Energization of the relay R7 is maintained by closure of its switch 133 which is connected in parallel with the vacuum switch 90 in the circuit 131. Completion of this circuit also energizes the solenoid 91 to open the valve 91a and admit compressed air from the source 92a to the conduit 48. Energization of the relay R7 also closes a switch 134 to complete the circuit 130 and start the timer TD–1 by which the length of the blow-back cycle is determined, the circuit including the switch 128 then held closed by the still energized timer TD–2.

Under the pressure, for example four p.s.i., of the air admitted into the conduit, the direction of flow of the filtrate in the conduit and in the chamber 14 will be reversed as the pump comes to a stop. The vacuum is thus dissipated and a small positive pressure builds up in the chamber. This causes immediate loosening of the filter cake 15 which is released from the web and starts to fall away from the web.

Upon expiration of the interval, for example 20 seconds, for which the timer TD–1 is set, the switch 132 is opened thus deenergizing the relay R7 and also the solenoid 91 thereby interrupting the flow of air into the conduit and the flow of filtrate into the chamber 14. Deenergization of the relay R7 opens the holding switch 133, and the switches 134 and 135 to deenergize and permit resetting of the timers TD–1 and TD–2. The simultaneous closure of the switch 126 by the relay R7 again completes the circuit through the closed switches 123 and 125 to reenergize the relay R2 and restart the pump motor 52 and thereby initiate another filtering cycle in the manner above described including reenergization of the timer TD–2 through the timer TD–3 and the closure of its switch 119.

*Operation to index and renew filter web*

Alternate filtering and blow-back cycles will continue to be executed so long as the interval of filtering before closure of the vacuum switch 90 is longer than the interval for which the timer TD–2 is set. Usually, the successive filtering cycles will become progressively shorter due to the trapping of the finer solid particles in the pores of the paper web. Eventually, the web will become clogged sufficiently to reduce the filtering efficiency an objectionable amount, this condition being evidenced by closure of the vacuum switch 90 before the interval measured by the timer TD–2 expires. Thereupon, an indexing cycle is executed automatically to remove, in this instance, the entire length of paper on the filter drum and replace the same with a fresh length drawn off from the supply roll 19. This cycle involves in succession, stopping the pump 51, raising of the drum 18 to expose the seal 55, dissipation of the vacuum within the chamber 14, separation of the on-coming and off-going lengths 53 and 54 of the paper at the seal 55, turning the drum through one revolution, restarting the pump to restore the vacuum, and reforming the seal by moving the two lengths of paper back into contact at the bar 59 as the drum frame is being lowered to again submerge the entire circumference of the drum.

As in the blow-back cycle above described, closure of the vacuum switch 90 to initiate an indexing cycle completes the circuit through the switch 132 then closed by the deenergized timer TD–1 to energize the relay R7 and the solenoid 91 which are locked in by closure of the switch 133. Opening of the switch 126 by the relay R7 breaks the circuit for the relay R2 and the timer TD–3 thus interrupting the energization of the pump motor 52.

Closure of the switch 135 provided for use in the blow-back cycle energizes the timer TD–2 but the latter does not time-out due to the length of the indexing cycle. Closure of the switch 134 by the relay R7 completes the circuit 129 through the then closed switches 127 and 138 for energizing the relay R3 which closes its holding switch 140 and also opens a switch 144 to prevent the float actuated switch 150 from then energizing the relay R6 in the ensuing raising of the drum frame relative to the liquid level 29. Closure of the switch 143 by R3 energizes the relay R4 through a switch 155 then closed by the deenergized timer TD–1. Relay R4 closes switches 145 to start the motor 77 in a direction to expand the screw jack and initiate raising of the drum frame 38.

By opening the solenoid valve 91ª and introducing compressed air into the conduit 48 at about the same time that the upward movement of the drum is started, the vacuum in the chamber 14 is dissipated at least by the time that the roller 84 on the carrier 63 encounters the stop 85 and starts to separate the paper parts of the seal as above described. The loss of the vacuum causes the switch 90 to open but energization of the relay R7 is continued by the maintaining switch 133. In addition to dissipating the vacuum so as to facilitate separating the parts of the paper seal 55, the continued flow of air into the conduit causes a small positive pressure to build up in the chamber the same as in a regular blow-back cycle. Thus, in the course of the indexing and until the air valve 91ª is closed, the pressure thus developed in the chamber 14 serves, as before, to loosen the filter cake and release the same from the web as the latter is being indexed out of filtering position.

Energization of the relay R3 to initiate raising of the drum also prepares a circuit 147 by which the indexing motor 70 is eventually started by closure of switches 148 by a relay R5. This circuit includes a switch 142 closed by the relay R3 when energized and a normally open switch 81 which remains open during raising of the drum frame but becomes closed when, after breaking the paper seal 55 by separation of the wet and dry parts of the web as above described, the drum frame reaches its uppermost or index position. The index motor thus started by the relay R5 turns the drum clockwise as viewed in FIG. 3.

A switch 149 also closed by the relay R5 in starting the indexing completes an auxiliary circuit 151 for energizing the timer TD–1 so that the latter may be used in the index cycle the same as in the blow-back cycles to determine the duration of the admission of compressed air to the conduit 48 and also the time of restarting the pump 51. The circuit 151 for maintaining the timer TD–1 energized extends through the switches 81, 142 and 149 and is in parallel with the circuit 130 used in the blow-back cycle.

The time required in the present instance for completing a complete indexing cycle exceeds the interval measured by the timer TD–1 which thus times-out in the course of the indexing thus opening the switches 132 and 155, the former acting to deenergize the solenoid 91 and close the air valve 91ª. Also the relay R7 is deenergized by opening of the switch 132 thereby opening its holding switch 133 and the switch 135 to deenergize the idly operating timer TD–2. Also, the switch 126 is reclosed to reenergize the relay R2 and the timer TD–3 thereby restarting the pump motor 52 and reenergizing the timer TD–2.

In the initial turning of the drum by the motor 70 while the raising of the drum frame continues, the lug 76 (FIG. 4) on the drum moves angularly away from the actuator for the switches 141 and 138 causing closing of the former and opening of the latter in succession. Switch 141 closes a parallel circuit for continuing the energization of the relay R5 through the switch 81. The relay R3 thus deenergized in response to opening of the switch 138 opens the holding switch 140 and the switches 142 and 143, the latter deenergizing the relay R4 to terminate the operation of the motor 77 in raising the drum frame 38. Although the switch 144 closes with the deenergization of the relay R3, the circuit for the relay R6 remains open at the switch 155 until the timer TD–1 becomes deenergized to reset itself and reclose the switch.

It will thus be seen that the pump is restarted before completion of the indexing of the drum but since all submerged areas of the latter are covered by the web, none of the dirty liquid enters the chamber 14 although some air will be drawn into the latter through the areas of the screen exposed above the level 29.

As the drum completes its indexing movement, a full revolution in this instance, the switches 138, 141 are reversed, opening of the latter to interrupt the circuit 147 and deenergize the relay R5 thus stopping the indexing motor 70. Also, the switch 149 is opened thus deenergizing the timer TD–1 which resets itself and closes its switch 155.

With the switches 144 and 155 thus closed as an incident to completion of the drum indexing, a circuit 153 is completed for energizing the relay R6 through the then closed switch 118 and the float 150 which is then closed due to the raised position of the drum. Energization of the relay R6 closes switches 154 thereby initiating operation of the motor 77 in a direction to collapse the screw jack and lower the drum frame. During such lowering, the paper carrier 63 is allowed to rock back to normal operating position thus bringing the wet and dry lengths of paper back together against the bar 59 so as to reform the seal 55. This occurs before complete submergence of the drum so that reformation of the seal is assisted by the vacuum built up in the chamber by the pump as the screen covered by the new length of paper becomes fully submerged. This motion continues until the drum and liquid level 29 reach the normal filtering position shown in FIGS. 3 and 7 whereupon the switch 150 is opened by the float 89 thus deenergizing the relay R6 to stop the motor 77. With the seal 55 thus reformed and submerged, normal filtering proceeds under the vacuum then built up in the drum chamber 14.

As the filtered material builds up on the submerged web and the capacity of the filter decreases correspondingly before the initiation of the blow-back or indexing cycle as above described, the level of the liquid in the tank may rise thus causing the float to close the switch 160. This energizes the relay R4 through the normally closed switch 155 thus starting the motor 77 and running the same to raise the drum frame 38 until the drum has been restored to the desired normal position relative to the liquid level 29. In this way, the float actuated switches operate during normal filtering to maintain the liquid at the desired level above described relative to the seal 55. The latter remains submerged and effective to prevent entry of any of the dirty liquid into the vacuum chamber.

The filtering may also be interrupted under manual control and the drum indexed through a regular cycle as above described. This may be accomplished by momentarily closing a switch 157 (FIG. 10) to complete an auxiliary circuit for energizing the relay R3. Such manual control is ordinarily used to advance a web from a new supply roll onto the drum.

In a similar way, indexing of the drum may be initiated automatically by closure of the switch 156 which is actuated by the lug 117 (FIG. 4) when the liquid in the tank rises to an objectionably high level as evidenced by a corresponding rise in the position of the drum frame under the control of the float switch 160. The filtering action is also interrupted automatically whenever the liquid in the tank falls to an abnormally low level, this being effected in response to opening of the switch 125 by the lug 117 on the drum frame.

*Modification—FIG. 11*

In the filtering of certain liquids in accordance with the present invention, it has been found that a surprisingly large number of alternate filtering and blow-back cycles may be executed before the filter web becomes clogged sufficiently to require replenishment of the active length of the filter web. In view of this, the overall construction of the filter may be simplified and much of the automatic control mechanism eliminated by constructing the web supporting member in a manner to permit easy replacement of the active or submerged length of the filter web manually or under manual control.

Such a modification as shown in FIG. 11, in which the filter web, its mounting, and the manner of indexing are the same as in the filter first described and accordingly the parts in common between the two filters are indicated by the same reference numerals. In this instance, the frame 38 rotatably supporting the drum 18 is secured to the tank 10 as through a cross-bar 170 thus fixing the drum axis. The latter is located so that an arcuate portion at the top of the drum is disposed above the level 171 of the dirty liquid 11 which level is determined by the position of the overflow outlet 28 and which is maintained by supplying liquid to the tank at a rate in excess of the average filtering capacity of the apparatus. To allow for such exposure of the upper part of the drum, an imperforate arcuate strip 172 is substituted for the screen on this part of the drum, the ends of the strip always extending somewhat below liquid level 171.

The paper web 12 unwound from the supply roll 19 is led onto the drum first over a stationary cross-bar 173 and then downward and reversely around a bar 174 and into contact with the imperforate area 172 at a point above the liquid. The off-going part of the web extends tangentially off from the drum at the imperforate area and then is led first upwardly and around a roll 175 on the frame 38, then over the top of laterally spaced cross-bars 176 and finally over the roll 66.

As before, the endless chain 73 extends around a sprocket 75 on the drum shaft and a pinion 72 fixed to a shaft 69 journaled on the drum frame 42 and carrying the roll 66. The shaft may be turned manually as by a hand crank but it is preferred to effect the indexing by the motor 70 as in the filter first described.

The drum is always indexed through a complete revolution so as to leave the imperforate area 172 at the top of the drum with the on-coming and off-going lengths of the web contacting this area which thus seals off the vacuum chamber 14.

*Operation of modified filter*

During a normal filtering cycle, the parts are positioned as shown in FIG. 11 and the successive blow-down cycles are initiated and terminated and the succeeding filtering cycle is started by controlling the operation of the pump 51 as above described using part of the circuit shown in FIG. 10. This is to say, the building up of a filter cake of substantial thickness on the web is accompanied by the attainment of a predetermined vacuum in the chamber 14. This is detected by closure of the vacuum switch 90 which energizes the relay R2 thereby opening the switch 126 to stop the pump motor as above described, compressed air also being admitted to the conduit 48 by energization of the solenoid 91 to reverse the flow of filtrate and the building up of a positive pressure in the drum chamber 14 sufficient to release the filter cake accumulated on the web. At the expiration of this interval, the timer TD–1 interrupts the air flow and initiates operation of the pump to rebuild the vacuum in the chamber and resume a filtering cycle as above described.

After a predetermined number of alternate filtering and blow-back cycles executed in succession in the manner above described or when the length of the filtering cycle indicates the need for replenishing the filter web, the filtering and blow-back cycles are interrupted and the motor 70 is started and run until the drum has been turned through one full revolution.

It will be apparent from the foregoing that a length of filter paper may be used efficiently in filtering an optimum volume of any given liquid by virtue of minimizing the time of interrupting the filtering to effect the blow-back or web-cleaning cycle. At the same time, the overall construction of the filter is exceedingly simple, and the web, when it eventually becomes clogged to an objectionable degree, may be replenished easily and economically from the supply roll.

I claim as my invention:

1. A vacuum filter having, in combination, a tank adapted to contain a body of liquid to be filtered, a member disposed in said tank and defining a vacuum chamber having an elongated perforated wall facing downwardly, a flexible filter web extending downwardly into said liquid, along said wall to cover the perforations therein, and then upwardly out of the liquid, means for advancing said web endwise to remove the used portion thereof from said wall and recover the wall with a fresh length of the web, a power driven pump operable to withdraw filtered liquid from said chamber and build up a vacuum therein to induce the straining of said liquid inwardly through the web and into said chamber, means operable in response to the attainment of a predetermined vacuum in said chamber to first interrupt the pumping of liquid out of said chamber and then force filtered liquid reversely into said chamber whereby to produce a positive pressure therein and force liquid outwardly through said wall and said web to release the filtered-out solids from the outer surface of said web, a timer for measuring an interval long enough to effect release of said filter cake, means for initiating operation of said timer in response to the attainment of said predetermined vacuum in said chamber, means controlled by said timer for restoring normal operation of said pump to withdraw liquid from said chamber and restoration of the vacuum therein, a second timer for measuring a second interval shorter than that required for the attainment of said predetermined vacuum when said web is new, means for activating said second timer during normal operation of said pump, and means controlled by said second timer and coupled to said web for automatically advancing the web to renew the covering on said perforated wall in the event that said predetermined vacuum is attained with said chamber before the expiration of said second timed interval.

2. A vacuum filter having, in combination, a tank adapted to contain a body of liquid to be filtered, a member disposed in said tank and defining a vacuum chamber having an elongated perforated wall facing downwardly, a flexible filter web extending downwardly into said liquid, along said wall to cover the perforations therein, and then upwardly out of the liquid, means for indexing said web endwise to remove the used portion thereof from said wall and recover the wall with a fresh length of the web, a power driven pump operable to withdraw filtered liquid from said chamber and build up a vacuum therein to induce the flow of said liquid inwardly through the web and wall and into said chamber, means operable in response to the attainment of a predetermined vacuum in said chamber to first interrupt the pumping of liquid out of said chamber and then force filtered liquid reversely into said chamber whereby to produce a positive pressure therein and force liquid outwardly through said wall and said web to thereby release the built up filter cake from the outer surface of the web, means activated as an incident to the attainment of said predetermined vacuum and operable to interrupt said reverse flow after a predetermined interval, means for restoring normal operation of said pump to withdraw liquid from said chamber and rebuilding up the vacuum therein after the lapse of said interval, means operable to measure a second interval indicative of a filtering time normally long enough to result in objectionable clogging of said web, and means coupled to said web and operable automatically in response to attainment of said predetermined pressure before expiration of said second interval to activate said indexing means and advance the web to renew at least a portion of the covering on said perforated wall.

3. A vacuum filter having, in combination, a tank adapted to contain a body of liquid to be filtered, a rotatably mounted drum submerged in said tank and defining an annular vacuum chamber having a perforated outer peripheral wall, an endwise movable web of a filter medium extending downwardly into said liquid, around said wall to cover the perforations therein and then out of the liquid, means for indexing said drum in a cycle of predetermined length to bring a fresh length of said web onto said wall, a conduit communicating with said chamber and extending outwardly from said tank, a power driven pump operable to withdraw filtered liquid out of said conduit and said chamber and build up a vacuum in the latter and thereby induce the straining of liquid through said web and said wall whereby to filter the liquid and build up a layer of filtered out solids on said outer surface of said web, means operable in response to the attainment of a predetermined vacuum in said chamber to initiate a blow-back cycle including stopping said pump and reversal of the flow of filtered liquid in said conduit whereby to build up a positive pressure in said chamber and force the liquid therein outwardly through said wall to loosen said layer of solids and release the same for gravitation downwardly in said liquid body, means operable as an incident to the attainment of said predetermined vacuum to interrupt said reverse flow after a predetermined interval, means operable after release of said layer to restart the withdrawal of liquid from said chamber by said pump, means for detecting objectionable clogging of said web, and means controlled by said detecting means and operable to initiate a cycle of said indexing means and also delay the restoration of the operation of said pump until completion of such indexing cycle.

4. A vacuum filter having, in combination, a tank adapted to contain a body of liquid to be filtered, a rotatably mounted drum submerged in said tank and defining an annular vacuum chamber having a perforated outer peripheral wall, an endwise movable web of a filter medium extending downwardly into said liquid around said wall to cover the perforations therein and then out of the liquid, mechanism for indexing said drum to bring a fresh length of said web onto said wall, a conduit communicating with said chamber and extending outwardly from said tank, a power driven pump operable to withdraw filtered liquid out of said conduit and said chamber and build up a vacuum in the latter and thereby induce the straining of liquid through said web and said wall whereby to filter the liquid and build up a layer of solids on said outer surface of said web, means operable in response to the attainment of a predetermined vacuum in said chamber to interrupt the pumping of filtered liquid out of said chamber and reverse the flow in said conduit whereby to build up a pressure in said chamber and force the liquid therein outwardly through said wall and through said web and thereby to loosen said layer and release the same for gravitation downwardly in said liquid body, means operable as an incident to the attainment of said predeterimned vacuum to interrupt said reverse flow after a predetermined interval, means operable after release of said layer to restart the withdrawal of liquid from said chamber by said pump, a timer operable automatically after starting of a filtering cycle to measure an interval shorter than that required to attain said predetermined vacuum when filtering through a fresh length of said web, means for starting said timer automatically as an incident to starting said pump, and means controlled by said timer and operable upon the attainment of said predetermined vacuum in said chamber before the lapse of said interval to initiate operation of said indexing mechanism.

5. A vacuum filter having, in combination, a tank adapted to contain a body of liquid to be filtered, a member disposed in said tank and defining a vacuum chamber having an elongated perforated wall facing downwardly, a flexible filter web extending downwardly into said liquid, along said wall to cover the perforations therein, and then upwardly out of the liquid, means for indexing said web endwise to remove the used portion thereof from said wall and recover the wall with a fresh length of the web, a power driven pump operable to withdraw filtered liquid from said chamber and build up a vacuum therein to induce the straining of said liquid inwardly through the web and into said chamber, means operable in response to the attainment of a predetermined vacuum in said chamber to first interrupt the pumping of liquid out of said chamber and then force filtered liquid reversely into said chamber whereby to produce a positive pressure therein and force liquid outwardly through said wall and said web to release the filtered-out solids from the outer surface of said web, a timer for measuring an interval long enough to effect release of said filter cake, means for initiating operation of said timer in response to the attainment of said predetermined vacuum in said chamber, means controlled by said timer for restoring normal operation of said pump to withdraw liquid from said chamber and restoration of the vacuum therein, and means for detecting substantial clogging of the active portion of said filter web as a result of repeated filtering cycles and intervening backwash cycles and operable to activate said indexing means to advance the web and renew the covering of said perforated wall.

6. A vacuum filter having, in combination, a tank adapted to contain a body of liquid to be filtered, a member disposed in said tank and defining a vacuum chamber having a perforated wall facing downwardly, a flexible filter web extending into said liquid and along said wall to cover the perforations therein, means for indexing said web endwise to remove the used portion thereof from said wall and recover the wall with a fresh length of web, a power driven pump operable to withdraw filtered liquid from said chamber and build up a vacuum therein to induce the straining of said liquid inwardly through said web and into said chamber, means operable in response to the attainment of a predetermined vacuum in said chamber to interrupt the pumping of liquid out of said chamber and terminate the normal filtering cycle and then force filtered liquid reversely into said chamber and outwardly through said web to release the filtered-out solids from the outer surface of the web, means for restoring the normal filtering operation after release of said solids, a timer for measuring a time interval shorter than that required for the attainment of said predetermined vacuum when said web is fresh, means for starting said timer automatically at the beginning of each filtering cycle, and means controlled by said timer and operable upon the attainment of said predetermined vacuum in said chamber before the lapse of said interval to activate said indexing means and recover said wall with a fresh length of web.

7. A vacuum filter having, in combination, a tank adapted to contain a body of liquid to be filtered, a member disposed in said tank and defining a vacuum chamber having a perforated wall facing downwardly, a flexible filter web extending into said liquid and along said wall to cover the perforations therein, means for indexing said web endwise to remove the used portion thereof from said wall and recover the wall with a fresh length of web, a power driven pump operable to withdraw filtered liquid from said chamber and build up a vacuum therein to induce the straining of said liquid inwardly through said web and into said chamber, means operable in response to the attainment of a predetermined vacuum in said chamber to interrupt the pumping of liquid out of said chamber and terminate the normal filtering cycle and then force filtered liquid reversely into said chamber and outwardly through said web to release the filtered-out solids from the outer surface of the web, means for restoring the normal filtering operation after release of said solids, and means for detecting substantial clogging of the active portion of said web as a result of repeated filtering cycles and operable to activate said indexing means to advance the web and renew the covering of said wall.

References Cited
UNITED STATES PATENTS

| | | | |
|---|---|---|---|
| 2,366,903 | 1/1945 | Harms et al. | 210—108 |
| 2,494,534 | 1/1950 | Armstrong et al. | 210—108 X |
| 2,752,045 | 6/1956 | Hornbostel | 210—387 |
| 2,823,806 | 2/1958 | Harlan | 210—387 |
| 3,206,030 | 9/1965 | Estabrook | 210—387 X |

FOREIGN PATENTS

| | | |
|---|---|---|
| 1,235,090 | 5/1960 | France. |

REUBEN FRIEDMAN, *Primary Examiner.*

D. M. RIESS, *Assistant Examiner.*